May 17, 1960     G. ORLOFF     2,936,738
REMOTE CONTROL SERVO SYSTEMS
Filed Jan. 3, 1956
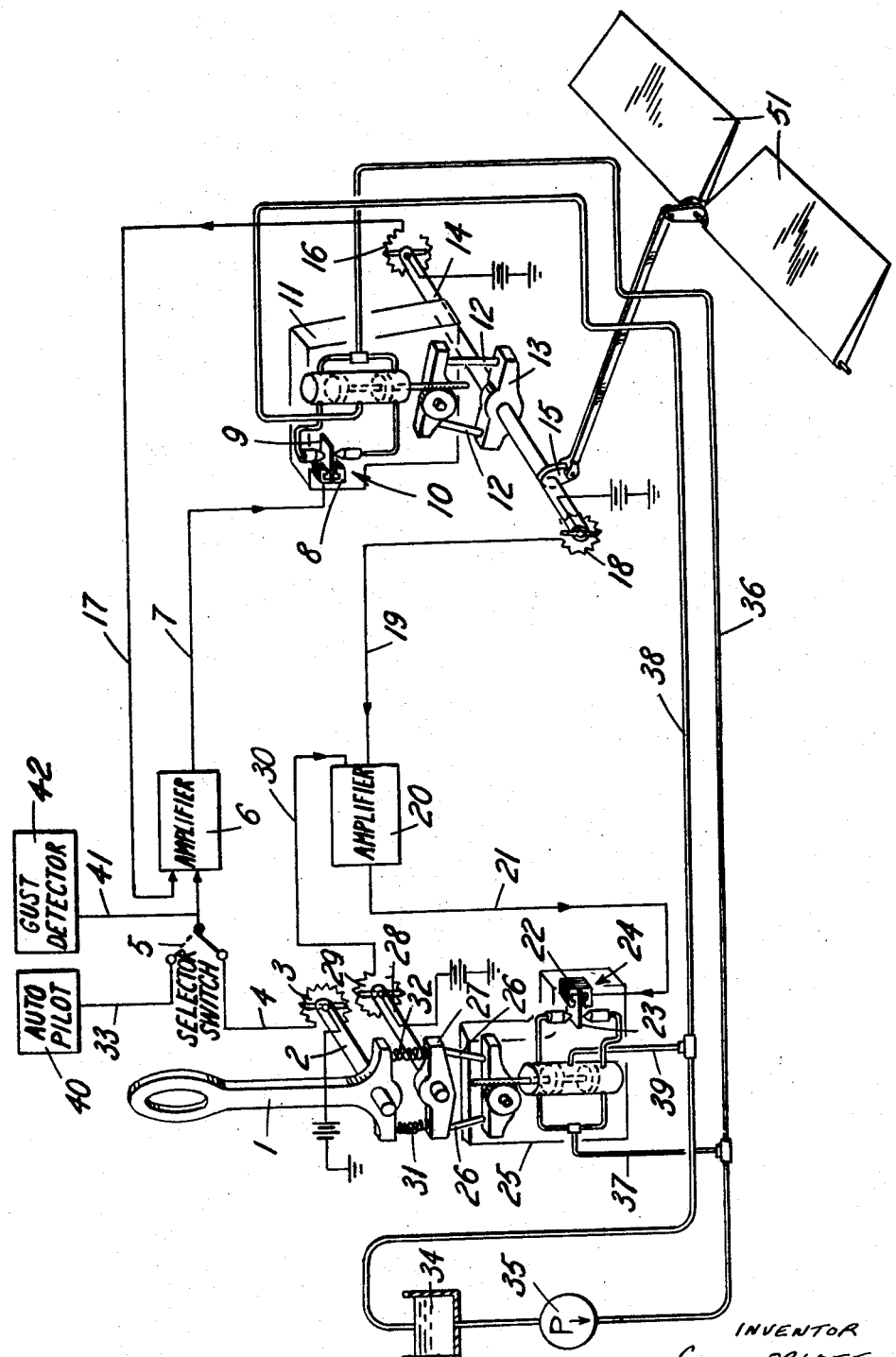
INVENTOR
George ORLOFF
By Watson, Cole, Grindle & Watson
ATTORNEYS

United States Patent Office 2,936,738
Patented May 17, 1960

2,936,738

REMOTE CONTROL SERVO SYSTEMS

George Orloff, Gloucester, England, assignor to British Messier Limited, Gloucester, England, a British company Application January 3, 1956, Serial No. 557,174

Claims priority, application Great Britain January 5, 1955

7 Claims. (Cl. 121—41)

This invention relates to remote control servo systems of the kind in which, when the operator wishes to be relieved of manual control, automatic means may be connected therewith to take over control. This type of control system may comprise mechanical, electrical, hydraulic or pneumatic transmission, or a combination of two or more of these, or any other type of transmission, between a manual controlling member and an output servo motor.

In such systems the automatic control means may either be connected to the system so as only to control the output servo motor, the manual controlling member remaining stationary, or the automatic control means may also move the manual controlling member, for example by being connected to it so as to operate the system through it. The former arrangement has the advantage in many cases of simplifying the automatic control means, of reducing the power which it is called upon to supply, of providing a more direct connection between it and the output servo motor and of obviating any danger that accidental interference with the free movement of the manual controlling member may affect the proper working of the system. On the other hand it is advantageous that the manual controlling member should be moved in phase with the output servo motor since it enables the operator to check at any time, by observing the movements of the manual controlling member, that the system is operating normally, and it also enables the operator to regain control with greater ease and certainty than would be the case if the controlling member could be out of phase with the output servo motor at the moment of change-over.

An object of the present invention is to provide a remote control servo system in which the advantages of both methods of connecting the automatic control means outlined above are obtained.

According to the present invention, there is provided a remote control servo system (for example for aircraft) comprising in combination an output servo motor having a movable output member for connection to the part to be actuated by the system, a manual controlling member operatively-connected with a first position signal transmitter for producing a control signal which can be varied in accordance with the position required to be taken up by said output member, a second position signal transmitter operatively connected with the output member so as to produce a first follow-up signal varying in accordance with the actual position of said output member, a subsidiary servo motor having a moving member connected with limited lost motion to the manual controlling member thereby to motivate it and determine the position thereof during non-manual operation of the system, a third position signal transmitter operatively connected with the moving member of the subsidiary servo motor so as to produce a subsidiary follow-up signal variable in accordance with the actual position of said moving member, a control arrangement for the output servo motor comprising means for receiving and comparing the follow-up signal from the second position transmitter and either the control signal from the first position transmitter or alternatively a like control signal from automatic control means and for energising the output servo motor so as to move its output member in a sense to reduce any difference between the actual position of said member as signalled by the second position transmitter and the required position signalled by the first position transmitter or the automatic control means, and a control arrangement for the subsidiary servo motor comprising means for receiving and comparing signals from the second and third position transmitters and for energising the subsidiary servo motor so as to move its moving member in a sense to reduce any difference between the actual position of said member as signalled by the third position transmitter and the position corresponding to the signal from the second position transmitter so that the subsidiary servo motor operates in phase with the output servo motor.

In this manner, when the system is under automatic control the manual controlling member is maintained positionally in phase with the output under the effect of signals transmitted by operation of the output servo motor.

In an arrangement which will now be described, by way of example, and with reference to the accompanying diagrammatic drawing, the invention is applied to an aircraft control system for operating flying control surfaces, e.g. elevators, ailerons and rudders, or for controlling the angular displacement of fluid jets. The servo motors are hydraulic, and the signals are alternating or direct electric currents transmitted by electrical transmission lines. The automatic control means comprises an automatic pilot, the electrical signals from which are fed into the system. All electrical signals may be increased in strength by the provision of amplifiers in the system.

A manual controlling member 1, which takes the form of a pilot's stick of inverted T-shape, is at its lower end secured to a horizontal shaft 2 one end of which carries the rotary member of a rotary input potentiometer 3 which forms a first position D.C. signal transmitter. An electrical transmission line 4 is taken from this potentiometer through one contact of a selector switch 5 to an amplifier 6 which may be of the electronic or electromagnetic type. A further transmission line 7 is taken from the amplifier 6 to an electromagnet 8 associated with the movable reed 9 of an electro-hydraulic relay valev 10 which controls the operation of an hydraulic output motor unit 11. This motor unit is operatively connected by means of a pair of rods 12 to opposite ends of a yoke member 13 which is secured on an output shaft 14 so arranged that operation of the motor unit causes angular displacement of the yoke member and shaft about the axis of the shaft. This output shaft 14 is provided with an arm 15 which is coupled in any convenient manner to the flying control surface 51 which is to be operated, so that angular movement of this arm 15 effected by the yoke member 13 causes corresponding movement of the control surface. The output shaft 14 also carries at one end the rotary part of a rotary feedback potentiometer 16 which forms a second position D.C. signal transmitter, from which a transmission line 17 is taken back to the amplifier 6. The opposite end of the output shaft 14 carries the rotary part of another feedback potentiometer 18 from which a transmission line 19 is taken to a second amplifier 20.

A transmission line 21 is taken from the second amplifier 20 to an electromagnet 22 associated with the movable reed 23 of a further electro-hydraulic relay valve 24 which controls the operation of an hydraulic servo motor unit 25 for actuating the pilot's stick 1. This stick-actuating motor unit 25 is also operatively-connected by means of a pair of rods 26 to a yoke member 27 which is secured to a further shaft 28 so arranged that operation of the motor unit 25 causes angular displacement of the yoke member about the axis of the shaft. One end of this further shaft 28 carries the rotary member of a feedback potentiometer 29 which forms a third position D.C. signal transmitter. From it a transmission line 30 is taken back to the second amplifier 20. Said further shaft 28 is positioned immediately below and in close proximity to the shaft 2 on which the pilot's stick 1 is carried, and is parallel therewith, the yoke member 27 lying substantially parallel to and in the same vertical plane as the horizontal transverse portion of the T-shaped pilot's stick. Alternatively two coil springs 31, 32 may be interposed between these two members, one on either side of the vertical plane of the axes of the two shafts 2, 28.

The system is such that an automatic pilot 40 may be connected into it through a transmission line 33 which connects with a second contact of the selector switch 5. Hydraulic fluid is supplied to the two motor units 11, 25 from a reservoir 34 through a pump 35 and pressure fluid conduits 36, 37, while the exhausting fluid from these units 11, 25 returns to the reservoir via exhaust conduits 38, 39.

In manual operation, i.e. when the selector switch 5 connects the first or pilot's stick potentiometer 3 to the first amplifier 6, and when the whole system is in equilibrium, the ingoing electrical signals to said amplifier from said potentiometer and the second position potentiometer 16 are equal and balance each other so that the reed 9 of the output servo relay 10 is in the neutral position and thus the corresponding yoke member 13 is not moved by the output motor unit 11. Similarly the ingoing signals to the second amplifier 20 from the second and third position potentiometers 18, 29 are equal and balance each other so that the reed 23 of the stick-actuating servo relay 24, is also in the neutral position and the corresponding yoke member 27 is likewise not moved by the stick-actuating motor unit 25.

If however the pilot's stick 1 is moved about the axis of its shaft 2 thereby increasing the strength of the signal to the first amplifier 6, then the two signals going into the amplifier are no longer balanced, the input signal being greater than the feedback signal. These signals are amplified and passed to the electromagnet 8 of the output servo relay 10. These signals cause the reed 9 of the relay to be displaced by an amount sufficient to cause the output motor unit 11 to move the corresponding yoke member 13 about the axis of its shaft 14 at a rate which is proportional to the difference between the electrical signals and in a direction dependent upon which signal is the larger. It will be understood that the motor unit 11 comprises a servo piston and cylinder controlled by the electrohydraulic relay 10 and operatively coupled in a convenient manner to the rods 12 connected to the yoke 13.

Movement of said yoke member 13 causes rotation of the output shaft 14 which accordingly increases the value of the signal from the second position potentiometer 16, which signal passes back to the amplifier 6, until it equals the value of the signal ingoing from the first position potentiometer 3, this equalisation causing the relay reed 9 to move to its neutral position and stopping further movement of the yoke member. Simultaneously, the other potentiometer 18 on the output shaft 14 transmits a signal to the second amplifier 20, which as with the output motor unit causes, through the stick-actuating servo relay 24, movement of the stick-actuating motor unit 25 to adjust thereby the angular position to the corresponding yoke member 27 beneath the pilot's stick. The shaft 28 of this yoke member is thus rotated so that the signal from the third potentiometer position 29 is increased until the signal fed back to the second amplifier 20 equals that passing to this amplifier from the second potentiometer position 18 whereupon operation of the stick-actuating motor unit and movement of the yoke member is stopped.

Thus it will be seen that movement of the pilot's stick causes adjustment of the flying control surface, and this adjustment is transmitted back to the yoke member below the stick which thereby follows up movement of the stick. The slight amount of free or lost motion required for the proper operation of the system is ensured by either the clearance between this yoke member and the transverse portion of the stick, or by the aforementioned springs 31, 32, if employed.

When it is desired to use the automatic pilot 40 the selector switch 5 is changed over to the second contact and automatic pilot signals are transmitted to the first amplifier 6. The system then works in the same manner, with movements of the control surface being transmitted to the yoke member 27 below the stick 1, so that the stick is moved in phase with the control surface.

Thus it will be seen that instead of directly transmitting signals from the automatic pilot to the stick as practiced hitherto, the actual movement of the yoke member 13 which is connected with the control surface, is transmitted and reproduced at the pilot's stick.

The system described may be adapted to receive electrical signals of a higher frequency than those which are supplied under the direct control of the pilot's stick, to compensate for excessive accelerations, gusts, or any other effects, which signals may be introduced into the system between the selector switch 5 and the first amplifier 6, through a transmission line 41, by an independent detector 42 which is sensitive to or anticipates such conditions.

We claim:

1. A servo system for actuating a part, for example, of an aircraft, comprising in combination an output servo motor, a movable output member of the output servo motor for connection to the part, a control signal transmitter for producing a control signal for controlling the position to be taken up by the output member, an output member position signal transmitter operatively connected with the output member so as to produce an output member position signal varying in accordance with the position of the output member, a manual control member, a subsidiary servo motor having a moving member, a limited lost motion device operatively connecting with limited lost motion said moving member with said manual control member, a subsidiary servo moving member position signal transmitter operatively connected with said moving member so as to produce a subsidiary servo moving member position signal in accordance with the actual position of said moving member, first means for receiving and comparing the output member position signal and the control signal, an output servo motor control arrangement, comprising said first means for energizing the output servo motor to urge its output member into such a position that the difference between the output member position signal and the control signal is minimized, a second means for receiving and comparing the output member position signal and the subsidiary servo moving member position signal, and a subsidiary servo motor control arrangement, comprising said second means, for energizing said subsidiary servo motor to urge said moving member into such a position that the difference between the subsidiary servo moving member position signal and the output member position signal is minimized.

2. A system as claimed in claim 1 comprising a plurality of control signal transmitters and switch means for bringing said transmitters individually and selectively into circuit.

3. A system as claimed in claim 2 comprising a control member position signal transmitter operatively connected to said manual control means for movement thereby, said control member position signal transmitter constituting one of said control signal transmitters.

4. A system as claimed in claim 3 comprising a shaft operatively connected to said manual control member to be rotated thereby, said control member position signal transmitter being constituted by a rotary electrical potentiometer type unit coupled to said shaft.

5. A system as claimed in claim 1 wherein both said output member and said moving member are constituted respectively by rotary shafts, and both said output member position signal transmitter and said subsidiary servo moving member position signal transmitter are constituted, respectively, by rotary electrical potentiometer type units, each coupled to the appropriate shaft.

6. A system as claimed in claim 1 including means for combining a signal with said control signal from the output member.

7. A system as claimed in claim 1, wherein the manual controlling member comprises a lever pivoted at its lower end and having a transverse member at said lower end to rock with the stem about the pivot, and a yoke is disposed close beneath and substantially parallel with the transverse member on the stem and is operatively connected to be rocked in the same plane as the controlling member by the subsidiary servo motor, whereby the yoke moves the controlling member either when the lost motion between the yoke and transverse member on the controlling member has been taken up or through the intermediary of spring connecting means between the yoke and said transverse member.

References Cited in the file of this patent

UNITED STATES PATENTS

| | | |
|---|---|---|
| 2,451,263 | Webb | Oct. 12, 1948 |
| 2,611,560 | Harcum | Sept. 23, 1952 |
| 2,634,391 | Rusler | Apr. 7, 1953 |
| 2,740,082 | Sedgfield | Mar. 27, 1956 |